(12) United States Patent
Sakai et al.

(10) Patent No.: US 11,485,322 B2
(45) Date of Patent: Nov. 1, 2022

(54) VEHICLE INFORMATION PROCESSING DEVICE AND VEHICLE INFORMATION PROCESSING METHOD

(71) Applicant: Toyota Jidosha Kabushiki Kaisha, Toyota (JP)

(72) Inventors: Katsuhiro Sakai, Hadano (JP); Makoto Kawaharada, Shizuoka-ken (JP); Akihide Tachibana, Susono (JP); Tomoyuki Kuriyama, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 499 days.

(21) Appl. No.: 16/693,734

(22) Filed: Nov. 25, 2019

(65) Prior Publication Data

US 2020/0223397 A1 Jul. 16, 2020

(30) Foreign Application Priority Data

Jan. 15, 2019 (JP) .............................. JP2019-004256

(51) Int. Cl.
| | |
|---|---|
| *B60R 25/33* | (2013.01) |
| *B60R 25/30* | (2013.01) |
| *G06Q 50/30* | (2012.01) |
| *E05B 77/54* | (2014.01) |
| *G06V 20/58* | (2022.01) |

(52) U.S. Cl.
CPC ............ *B60R 25/33* (2013.01); *B60R 25/305* (2013.01); *E05B 77/54* (2013.01); *G06Q 50/30* (2013.01); *G06V 20/58* (2022.01); *B60R 2325/205* (2013.01)

(58) Field of Classification Search
None
See application file for complete search history.

(56) References Cited

U.S. PATENT DOCUMENTS 11,036,226 B2 * 6/2021 Salter .................... G06Q 50/30
2017/0314948 A1 11/2017 Racah et al.
(Continued)

FOREIGN PATENT DOCUMENTS

| EP | 3190025 A1 | 7/2017 |
| JP | 2010-076483 A | 4/2010 |

(Continued)

*Primary Examiner* — Carlos Garcia
(74) *Attorney, Agent, or Firm* — Dinsmore & Shohl LLP

(57) ABSTRACT

A vehicle information processing device includes an arrival determination unit that determines, based on positional information of a vehicle under autonomous driving control, whether or not the vehicle arrives at a destination, an approval determination unit that determines, based on approval notification, whether or not a user approves the arrival of the vehicle at the destination, a safety determination unit that determines whether or not surroundings of the vehicle are safe to the user who unboards the vehicle based on vehicle environment information surrounding the vehicle, and a door controller that requests a door control device to open a door in a case where determination is made that the vehicle arrives at the destination, determination is made that the user approves the arrival of the vehicle at the destination, and determination is made that the surroundings of the vehicle are safe to the user who unboards the vehicle.

10 Claims, 11 Drawing Sheets

(56) References Cited

U.S. PATENT DOCUMENTS

| | | | |
|---|---|---|---|
| 2018/0039274 A1* | 2/2018 | Saibel | G05D 1/0291 |
| 2019/0061688 A1 | 2/2019 | Watanabe | |
| 2019/0071916 A1 | 3/2019 | Dusina et al. | |
| 2020/0018100 A1 | 1/2020 | Aoi et al. | |
| 2020/0241529 A1* | 7/2020 | Salter | B60Q 9/00 |
| 2021/0354701 A1* | 11/2021 | Lee | B60W 60/001 |

FOREIGN PATENT DOCUMENTS

| | | |
|---|---|---|
| JP | 2010-133901 A | 6/2010 |
| JP | 2010-196377 A | 9/2010 |
| JP | 2017-050008 A | 3/2017 |
| JP | 2018-008576 A | 1/2018 |
| JP | 2018008576 A * | 1/2018 |
| JP | 2018-144686 A | 9/2018 |
| JP | 2018-156436 A | 10/2018 |
| JP | 2018-160135 A | 10/2018 |
| JP | 2018156436 A * | 10/2018 |
| JP | 2018-205085 A | 12/2018 |
| JP | 6724832 B2 * | 7/2020 |
| WO | 2012/143300 A1 | 10/2012 |

\* cited by examiner

VEHICLE INFORMATION PROCESSING DEVICE AND VEHICLE INFORMATION PROCESSING METHOD

CROSS-REFERENCE TO RELATED APPLICATIONS

This application claims priority to Japanese Patent Application No. 2019-004256 filed on Jan. 15, 2019, which is incorporated herein by reference in its entirety including the specification, drawings and abstract.

BACKGROUND

1. Technical Field

The present disclosure relates to a vehicle information processing device and a vehicle information processing method.

2. Description of Related Art

In recent years, an autonomous driving vehicle in which driving is performed through autonomous driving control has been developed. In the vehicle under the autonomous driving control, a driving operation, such as drive, steering, and braking, performed by a person in the related art is performed by, for example, an electronic control unit (ECU) mounted in the vehicle.

A technique that provides a mobility service, such as a taxi service, using such an autonomous driving vehicle has been suggested.

A user who makes a request for the provision of the mobility service transmits a boarding position and a destination to a server. The server selects one vehicle usable by the user and allocates the vehicle to the user.

With this, the user boards the allocated vehicle and moves to the destination.

In a case where the vehicle arrives at the destination, a door of the vehicle is opened and closed to make the user unboard the vehicle.

A moving object, such as another vehicle, is traveling on a road, and there is a concern that the user who unboards the vehicle comes into contact with the moving object approaching the stopped vehicle.

For example, Japanese Unexamined Patent Application Publication No. 2018-008576 (JP 2018-008576 A) has suggested a technique in which determination is made whether or not a vehicle is stopped and an opening area of a door is lapped with a door opening determination line, and in a case where determination is made that the opening area of the door is lapped with the door opening determination line in a situation in which an approaching object is present, issues an warning.

SUMMARY

In the vehicle under the autonomous driving control, since there is a case where a manager who manages traveling of the vehicle does not board the vehicle, a new technique that allows the user to confirm the safety of the user who unboards the vehicle is expected.

The present disclosure provides a vehicle information processing device that opens and closes a door after confirmation is made that the surroundings of a vehicle are safe to a user who unboards the vehicle.

A first aspect of the present disclosure relates to a vehicle information processing device. The vehicle information processing device includes an arrival determination unit, an approval determination unit, a safety determination unit, and a door controller. The arrival determination unit is configured to determine whether or not a vehicle arrives at a destination based on positional information of the vehicle under autonomous driving control. The approval determination unit is configured to determine, based on approval notification for notifying that a user approves the arrival of the vehicle at the destination, whether or not the user approves the arrival of the vehicle at the destination. The safety determination unit is configured to determine whether or not surroundings of the vehicle are safe to the user who unboards the vehicle based on vehicle environment information surrounding the vehicle. The door controller is configured to request a door control device to open a door in a case where determination is made that the vehicle arrives at the destination, determination is made that the user approves the arrival of the vehicle at the destination, and determination is made that the surroundings of the vehicle are safe to the user who unboards the vehicle.

The vehicle information processing device according to the first aspect of the present disclosure may further include a fare adjustment determination unit configured to determine, based on fare adjustment end notification for notifying that the user pays a fee of use of the vehicle, whether or not the user pays the fee of the use of the vehicle. The door controller may be configured to request the door control device to open the door in a case where determination is made that the vehicle arrives at the destination, determination is made that the user approves the arrival of the vehicle at the destination, determination is made that the surroundings of the vehicle are safe to the user who unboards the vehicle, and determination is made that the user pays the fee of the use of the vehicle.

In the vehicle information processing device according to the first aspect of the present disclosure, the safety determination unit may be configured to determine whether or not a moving object moving to approach the vehicle is present based on the vehicle environment information surrounding the vehicle, in a case where determination is made that the moving object is present, estimate a moving trajectory of the moving object, and determine whether the surroundings of the vehicle are safe to the user who unboards the vehicle based on the moving trajectory.

In the vehicle information processing device according to the first aspect of the present disclosure, the door controller may be configured to display unboarding of the user to be visible from the outside of the vehicle using a display device and then request the door control device to open the door in a case where the safety determination unit determines that a moving object approaching the vehicle is present and determines that the surroundings of the vehicle are safe to the user who unboards the vehicle based on the moving trajectory of the moving object.

In the vehicle information processing device according to the first aspect of the present disclosure, the door controller may be configured to request the door control device to open the door under a first condition for defining a speed of opening the door or an opening degree of the door in a case where the safety determination unit determines that the moving object approaching the vehicle is not present, and the door controller is configured to request the door control device to open the door under a second condition that the speed of opening the door is slower or the opening degree of the door is narrower than the first condition in a case where the safety determination unit determines that the moving object approaching the vehicle is present and determines that the surroundings of the vehicle are safe to the user who unboards the vehicle based on the moving trajectory of the moving object.

In the vehicle information processing device according to the first aspect of the present disclosure, the safety determination unit may be configured to determine whether or not an obstacle is present surrounding the destination before the vehicle arrives at the destination based on the vehicle environment information surrounding the vehicle.

In the vehicle information processing device according to the first aspect of the present disclosure, the safety determination unit may be configured to, in a case where determination is made that an obstacle is present surrounding the destination, decide a stop position of the vehicle to a position at a predetermined distance from the obstacle.

In the vehicle information processing device according to the first aspect of the present disclosure, the safety determination unit may be configured to, in a case where an obstacle is present surrounding the destination, determine that the surroundings of the vehicle are safe to the user who unboards the vehicle after deciding to prohibit the door control device from opening a door on a side on which the obstacle is present. The door controller may be configured to request the door control device to open a door on a side where the obstacle is not present.

In the vehicle information processing device according to the first aspect of the present disclosure, the safety determination unit may be configured to determine that the surroundings of the vehicle are safe to the user who unboards the vehicle based on flatness of a road surface at the destination.

A second aspect of the present disclosure relates to a vehicle information processing method. The vehicle information processing method includes, by a processor, determining, based on positional information of a vehicle under autonomous driving control, whether or not the vehicle arrives at a destination, determining, based on approval notification for notifying that a user approves the arrival of the vehicle at the destination, whether or not the user approves the arrival of the vehicle at the destination, determining whether or not the surroundings of the vehicle are safe to the user who unboards the vehicle based on vehicle environment information surrounding the vehicle, and requesting a door control device configured to control opening and closing of a door of the vehicle to open the door in a case where determination is made that the vehicle arrives at the destination, determination is made that the user approves the arrival of the vehicle at the destination, and determination is made that the surroundings of the vehicle are safe to the user who unboards the vehicle.

The vehicle information processing device disclosed in the specification described above opens and closes a door after confirmation that the surroundings of a vehicle are safe to a user who unboards the vehicle.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
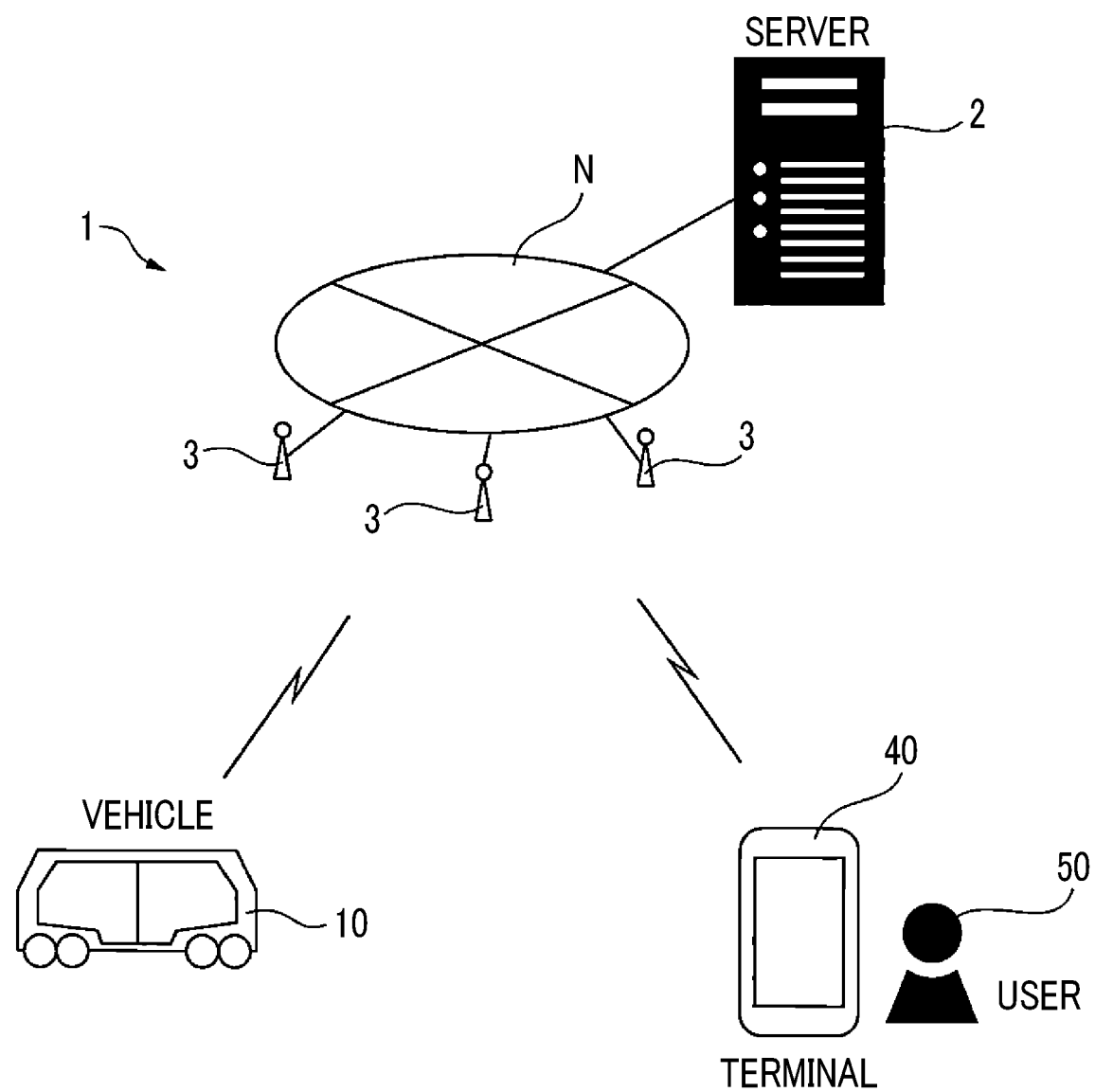
FIG. 1 is a diagram showing the configuration of an embodiment of a vehicle information processing system of the present disclosure.

Hereinafter, an embodiment of a vehicle information processing system disclosed in the specification will be described referring to the drawings. It should be noted that the technical scope of the present disclosure is not limited to the embodiment and encompasses the present disclosure described in the claims and equivalents thereof.

FIG. 1 is a diagram showing the configuration of an embodiment of a vehicle information processing system of the present disclosure.

A vehicle information processing system 1 (hereinafter, simply referred to as a system 1) of the embodiment includes a vehicle 10 that is under autonomous driving control, a server 2, and a terminal 40 that is operated by a user 50. The server 2 is connected to perform communication with the vehicle 10 and the terminal 40 through a network N by way of a wireless base station 3.

The vehicle 10 can be an autonomous driving vehicle that provides a service (mobility service) as a mobility, such as a taxi, a bus, or ride-sharing.

The user 50 who makes a request for the provision of the mobility service operates the terminal 40 to make a request to the server 2 for vehicle allocation. The user 50 boards the vehicle 10 allocated by the server 2. The vehicle 10 allows the user 50 to board the vehicle and moves to a destination. The user 50 operates the terminal 40 to transmit arrival at the destination to the server 2. In a case where the vehicle 10 arrives at the destination, the vehicle 10 receives, from the server 2, arrival approval notification for notifying that the user approves the arrival of the vehicle at the destination, and after determination is made that the surroundings of the vehicle 10 are safe to the user 50, opens and closes a door to make the user unboard the vehicle. With this, the user 50 can safely unboard the vehicle 10 after confirming the arrival at the destination.

In FIG. 1, although one user 50 and one terminal 40 are shown, the number of users who use the system 1 may be plural. In this case, in communication between the terminals 40 and the server 2, each terminal may be identified using terminal identification information for identifying the terminal. Each user may be identified using user identification information for identifying the user.

In FIG. 1, although one vehicle 10 is shown, the system 1 may include a plurality of vehicles 10 that is under the autonomous driving control. In this case, in communication between the vehicles 10 and the server 2, each vehicle may be identified using vehicle identification information for identifying the vehicle.

Hereinafter, the vehicle 10 will be described in more detail.

Figure 2:
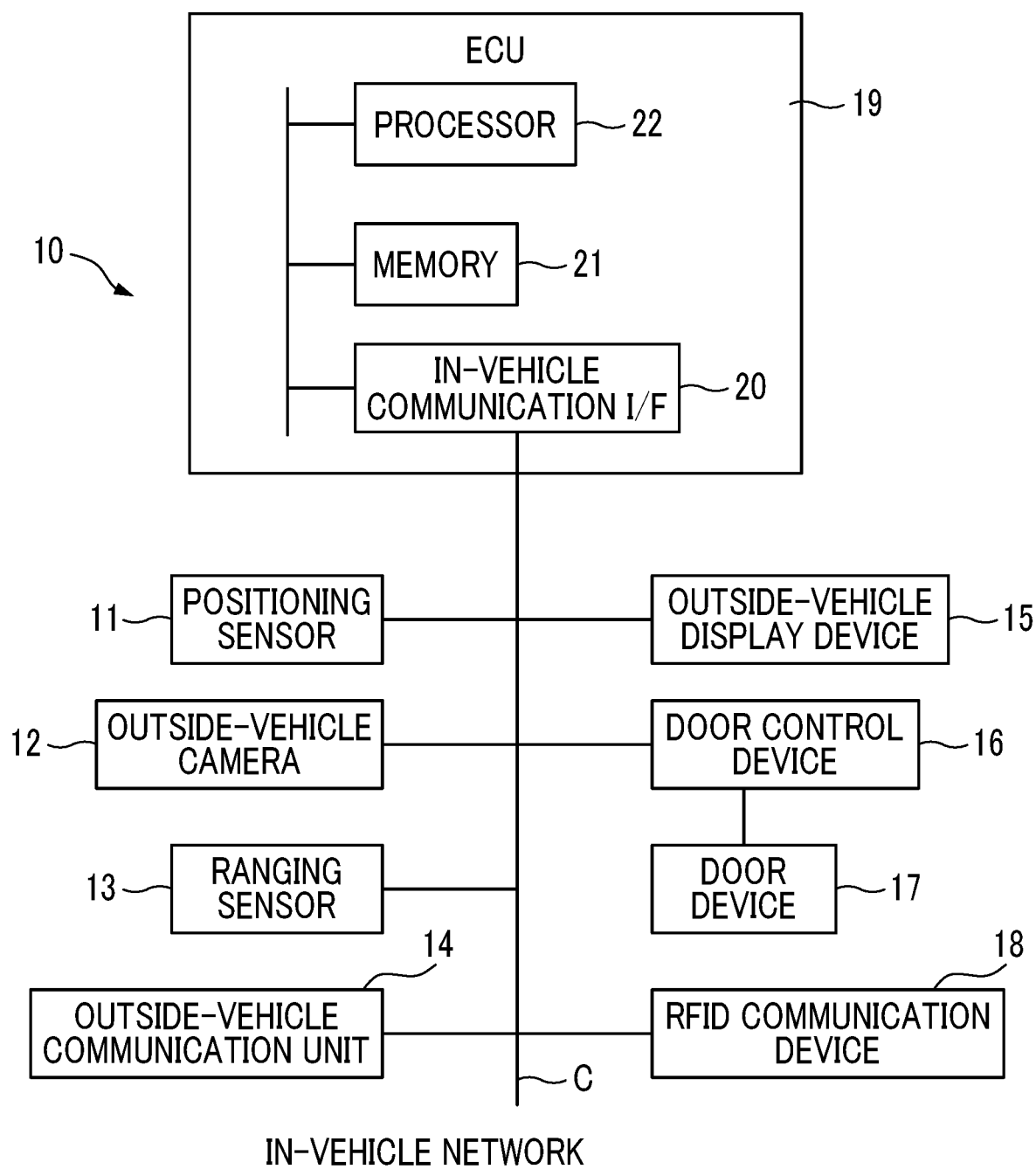
FIG. 2 is a hardware configuration diagram of a vehicle.

FIG. 2 is a hardware configuration diagram of the vehicle 10.

The vehicle 10 includes a positioning sensor 11, outside-vehicle cameras 12, ranging sensors 13, an outside-vehicle communication unit 14, outside-vehicle display devices 15, a door control device 16, door devices 17, an RFID communication device 18, and an ECU 19 connected to one another through an in-vehicle network C. As the in-vehicle network C, for example, a network conforming to a controller area network (CAN) standard can be used.

The positioning sensor 11 generates positional information indicating a current place of the vehicle 10 and outputs the positional information to the ECU 19. The positional information generated by the positioning sensor 11 is used for automatic control of the driving of the vehicle 10 in the ECU 19. The positional information generated by the positioning sensor 11 is also transmitted to the server 2 through the network N at regular intervals such that the server 2 can ascertain the current place of the vehicle 10. The positioning sensor 11 is, for example, a global positioning system (GPS) receiver of a car navigation system provided in the vehicle 10.

Figure 3:
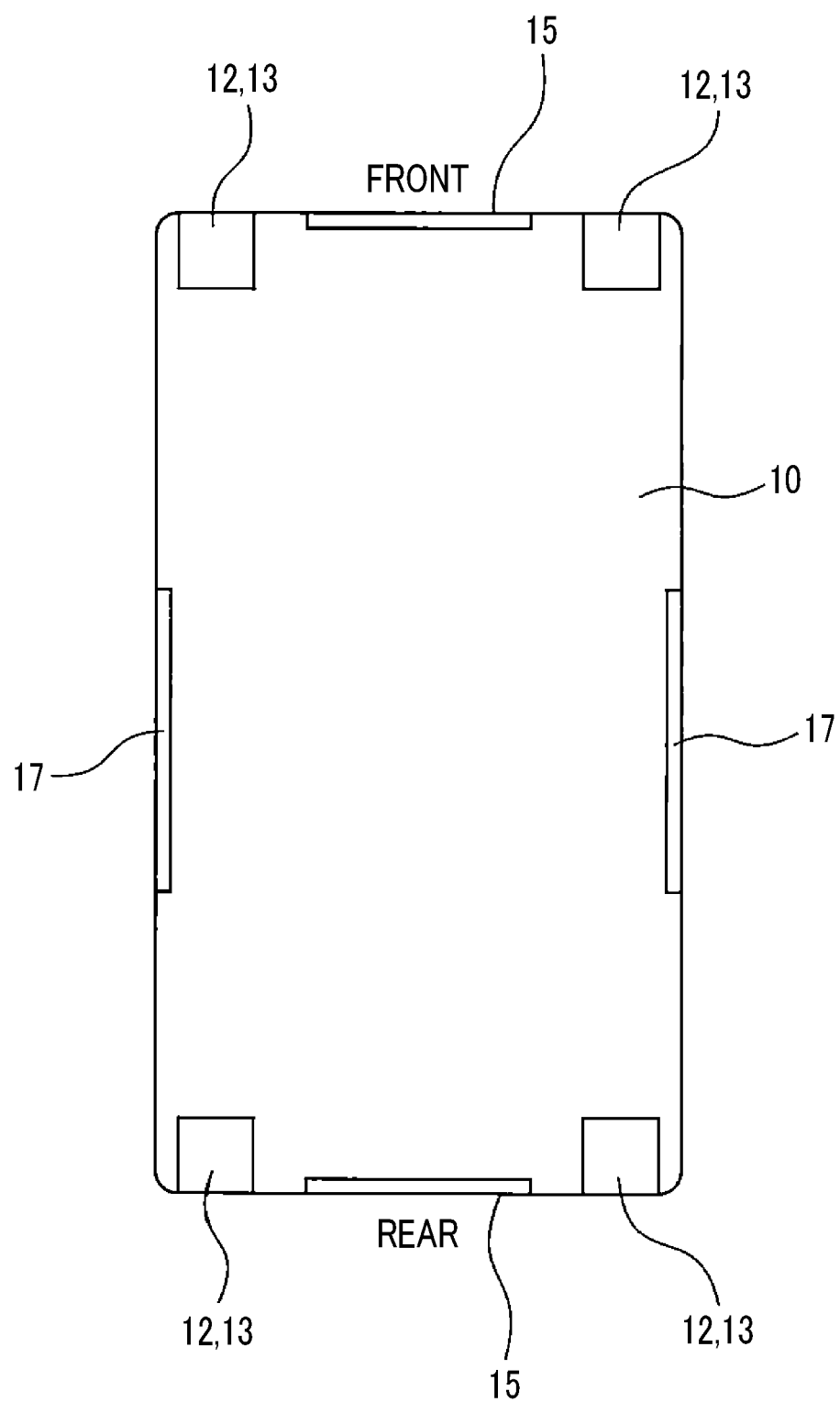
FIG. 3 is a diagram illustrating the vehicle.

The outside-vehicle cameras 12 image a road, an object, and a person surrounding the vehicle 10 and output captured video to the ECU 19. The video of a road, an object, and a person captured by the outside-vehicle camera 12 is used for automatic control of the driving of the vehicle 10 in the ECU 19. The video captured by the outside-vehicle cameras 12 is also used for making determination that the surroundings of the vehicle 10 are safe to the user who unboards the vehicle as vehicle environment information surrounding the vehicle 10 at the destination of the user 50. As shown in FIG. 3, the outside-vehicle cameras 12 are arranged, for example, on the front right and left sides and the rear right and left sides of the vehicle 10 toward the vehicle outside.

The ranging sensors 13 measure distances to objects surrounding the vehicle 10 in corresponding azimuths and output measured values of the distances to the ECU 19. The measured values of the distances obtained by the ranging sensor 13 are used for automatic control of the driving of the vehicle 10 in the ECU 19. The measured values of the distances obtained by the ranging sensor 13 are also used for making determination that the surroundings of the vehicle 10 are safe to the user who unboards the vehicle as the vehicle environment information surrounding the vehicle at the destination of the user 50. As shown in FIG. 3, the ranging sensors 13 are arranged, for example, on the front right and left sides and the rear right and left sides of the vehicle 10 toward the vehicle outside. The ranging sensors 13 are, for example, light detection and ranging (LIDAR) sensors. In FIG. 3, since the ranging sensors 13 are arranged at positions close to the outside-vehicle cameras 12, the ranging sensors 13 are shown at the same positions as the outside-vehicle cameras 12.

The outside-vehicle communication unit 14 is an in-vehicle communication device having a wireless communication function. The outside-vehicle communication unit 14 accesses, for example, the wireless base station 3 connected to the network N through a gateway (not shown) or the like, whereby the outside-vehicle communication unit 14 is connected to the network N through the wireless base station 3. The outside-vehicle communication unit 14 is configured to perform communication with the server 2 and the terminal 40 through the network N.

The outside-vehicle display device 15 displays various kinds of information to be visible from the outside of the vehicle 10 under the control of the ECU 19. For example, the outside-vehicle display device 15 displays unboarding of the user 50 to be visible from the outside of the vehicle 10 before the user 50 unboards the vehicle at the destination. As shown in FIG. 3, the outside-vehicle display device 15 is arranged, for example, on the front side and the rear side of the vehicle 10 toward the vehicle outside. As the outside-vehicle display device 15, for example, a liquid crystal display can be used.

The door control device 16 controls opening and closing of the door devices 17 in response to a door control signal output from the ECU 19.

The door devices 17 are arranged on the right and left sides in a moving direction of the vehicle 10. Each of the door devices 17 has, for example, a door and a drive device that drives the door. The door devices 17 open and close the doors under the control of the door control device 16. As shown in FIG. 3, the door devices 17 are arranged, for example, on the right and left side of the vehicle 10.

The radio frequency identifier (RFID) communication device 18 is a communication device that performs communication with an IC card including an RFID device, or the like. The RFID communication device 18 is used, for example, in a case where the user 50 pays a fee of use of the vehicle 10 using an IC card having an electronic payment function.

The ECU 19 performs the autonomous driving control of the vehicle 10 to make the user 50 travel from a boarding place to the destination. The ECU 19 requests the door control device 16 to open the door in a case where determination is made that the vehicle 10 arrives at the destination, determination is made that the user 50 approves the arrival of the vehicle 10 at the destination, and determination is made that the surroundings of the vehicle 10 are safe to the user who unboards the vehicle.

The ECU 19 has an in-vehicle communication interface (I/F) 20, a memory 21, and a processor 22 connected to one another through signal lines. The in-vehicle communication I/F 20 is a communication I/F circuit that allows the ECU 19 to perform communication with other in-vehicle equipment of the vehicle 10 through the in-vehicle network C.

The memory 21 is an example of a storage unit, has a storage medium, such as a semiconductor memory, and stores a computer program that is executed by the processor 22. The memory 21 also stores information regarding the boarding place, the destination, and a traveling route from the boarding place to the destination of the user 50 received from the server 2. The memory 21 may also store map data or the like that is referred to in order to make the vehicle 10 travel.

The processor 22 has one or more arithmetic circuits that execute the computer program to be performed in the ECU 19, and peripheral circuits thereof.

Figure 4:
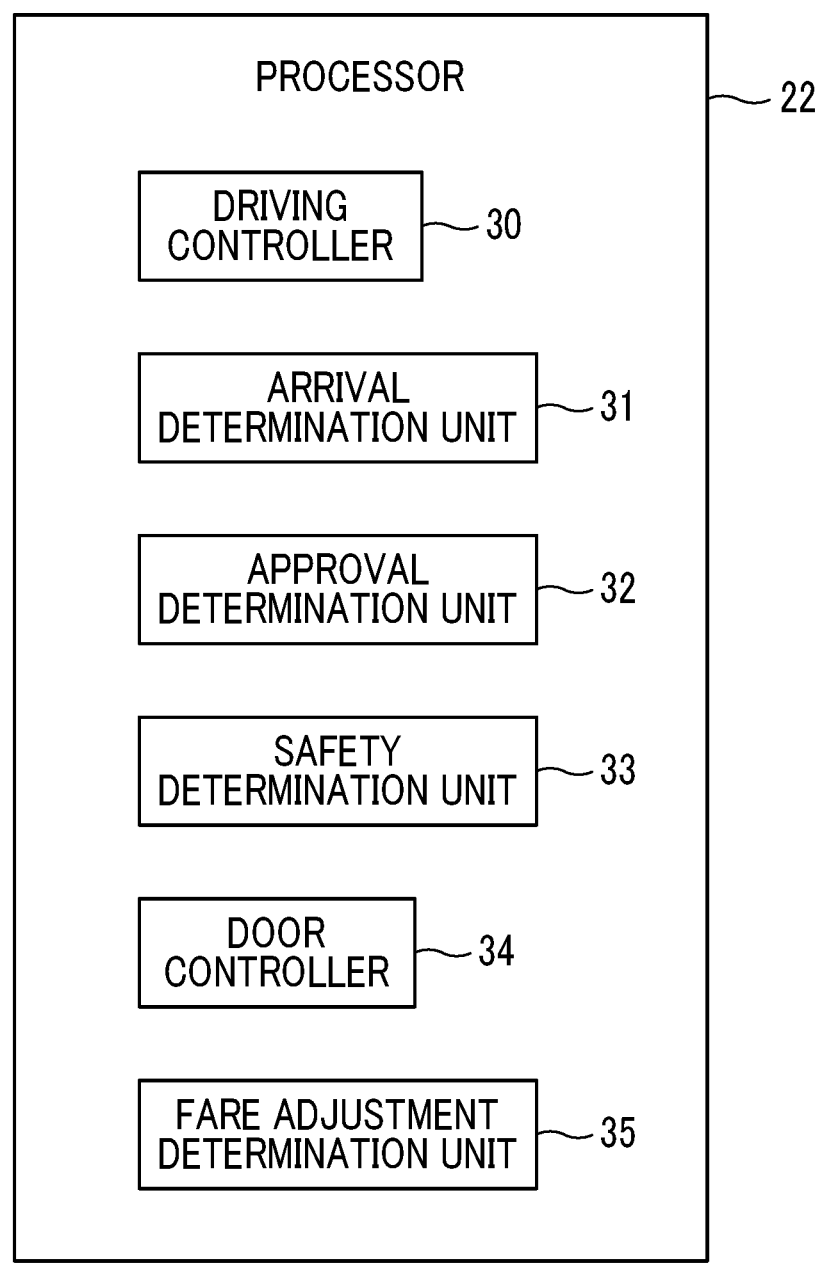
FIG. 4 is a functional block diagram of a processor.

FIG. 4 is a functional block diagram of the processor 22 of the ECU 19 of the vehicle 10.

The processor 22 has a driving controller 30, an arrival determination unit 31, an approval determination unit 32, a safety determination unit 33, a door controller 34, and a fare adjustment determination unit 35. These units are, for example, software modules that are implemented by the computer program to be executed on the processor 22. These units may be mounted as firmware that is implemented by the processor 22 or may be implemented as arithmetic circuits formed of an FPGA or an ASIC.

The driving controller 30 outputs a control signal generated such that the vehicle 10 moves to the destination along a route based on the vehicle environment information input from the positioning sensor 11, the outside-vehicle cameras 12, the ranging sensors 13, a vehicle speed sensor (not shown), and the like to a drive unit, a steering unit, and a braking unit (not shown) to control traveling of the vehicle 10.

The arrival determination unit 31, the approval determination unit 32, the safety determination unit 33, the door controller 34, and the fare adjustment determination unit 35 execute processing for determining that the vehicle 10 arrives at the destination and that the surroundings of the vehicle 10 are safe to the user who unboards the vehicle, and opening and closing the door devices 17, or the like. Details of the processing that is executed by the arrival determination unit 31, the approval determination unit 32, the safety determination unit 33, the door controller 34, and the fare adjustment determination unit 35 will be described below.

Figure 5:
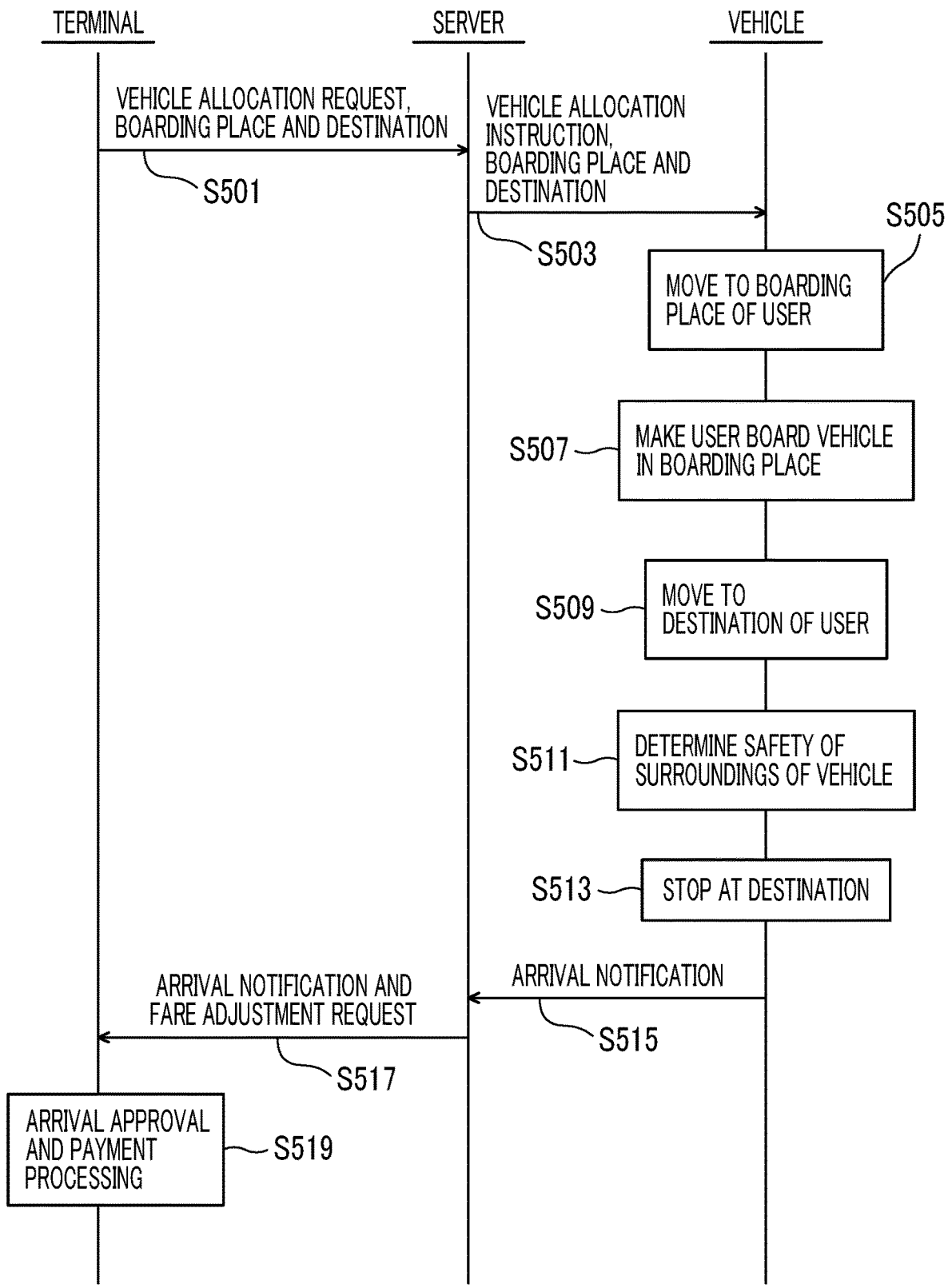
FIG. 5 is a sequence diagram (first view) illustrating an operation of the system.
Figure 6:
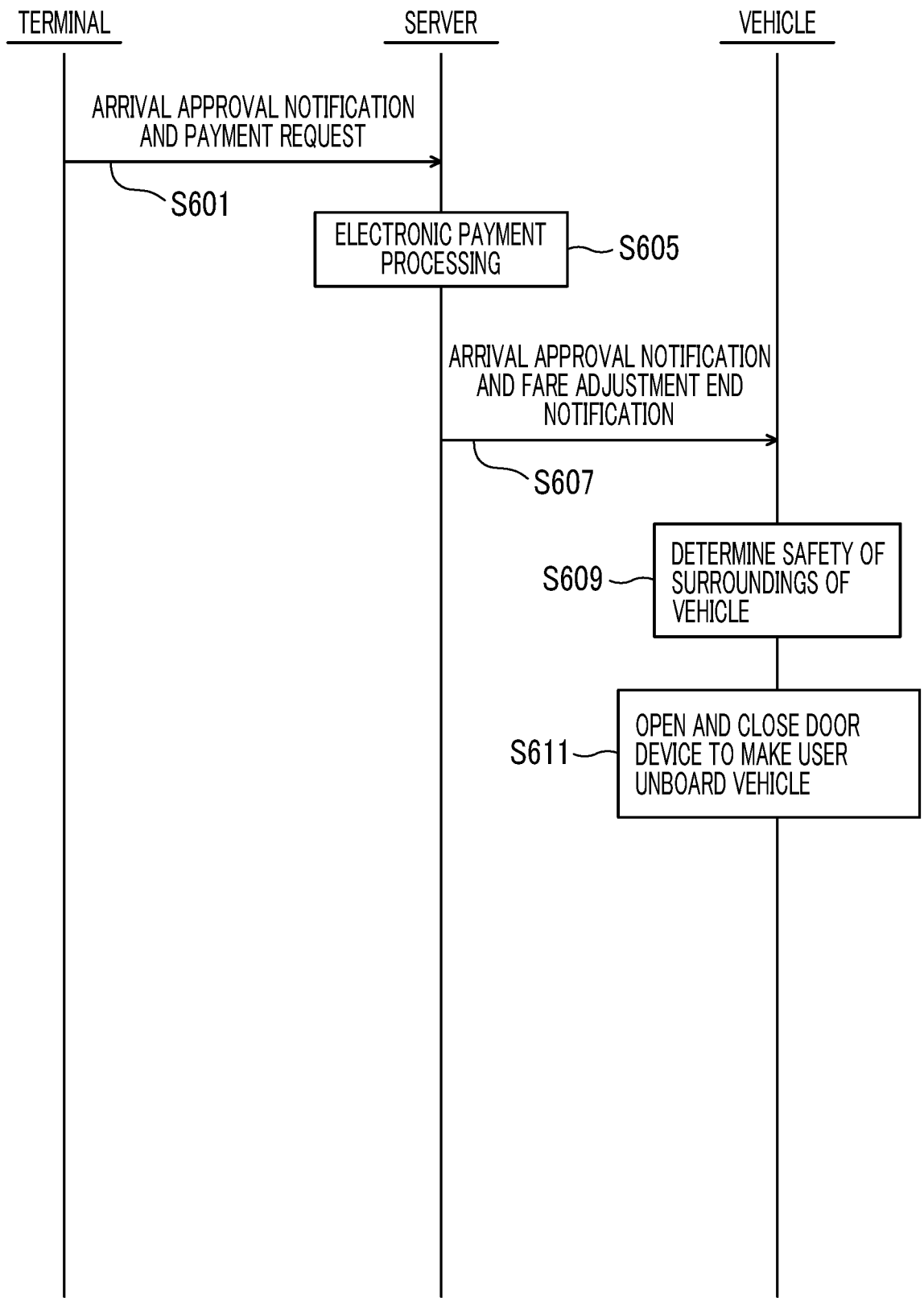
FIG. 6 is a sequence diagram (second view) illustrating the operation of the system.

Next, the operation of the system 1 described above will be described below referring to sequence diagrams shown in FIGS. 5 and 6.

First, in Step S501, the server 2 receives information regarding a vehicle allocation request, a boarding place, a destination, and the like from the terminal 40 of the user 50 who makes a request for the provision of the mobility service. Information regarding the boarding place and the destination is designated by, for example, a facility name, an address, or a combination of a latitude and a longitude.

Next, in Step S503, the server 2 searches for the vehicles 10 within a given range from the boarding place where the user 50 waits for vehicle allocation and selects the vehicle 10 to be allocatable from at least one searched vehicle 10. The server 2 also searches for a route of traveling from a current place of the vehicle 10 to the boarding place and from the boarding place to the destination. Then, the server 2 transmits information regarding the boarding place, the destination, the route, and the like to the vehicle 10 along with a vehicle allocation instruction. In a case where the vehicle 10 provides a ride-sharing service or the like, there is a possibility that another user is boarding the vehicle 10. In this case, the server 2 may select the vehicle 10 with the destination of another user who is boarding the vehicle 10 in the same direction as the destination of the user 50 from at least one searched vehicle 10.

Next, in Step S505, in a case where the vehicle allocation instruction is received from the server 2, the vehicle 10 moves from the current place of the vehicle 10 to the boarding place where the user 50 waits for vehicle allocation.

Next, in Step S507, in a case of arriving at the boarding place of the user 50, the vehicle 10 opens and closes the door devices 17 of the vehicle 10 to make the user 50 board the vehicle 10.

Next, in Step S509, the vehicle 10 moves from the current place of the vehicle 10 to the destination of the user 50 along the traveling route of the vehicle 10.

Next, in Step S511, in a case of approaching the destination at a predetermined distance, the vehicle 10 determines whether or not the surroundings of the vehicle 10 are safe to the user who unboards the vehicle based on the vehicle environment information surrounding the vehicle 10. The arrival determination unit 31 of the processor 22 in the ECU 19 determines that the vehicle 10 approaches the destination at the predetermined distance based on the positional information of the vehicle 10 output from the positioning sensor 11. The predetermined distance can be set to, for example, 10 m, 20 m, and 30 m.

Figure 7:
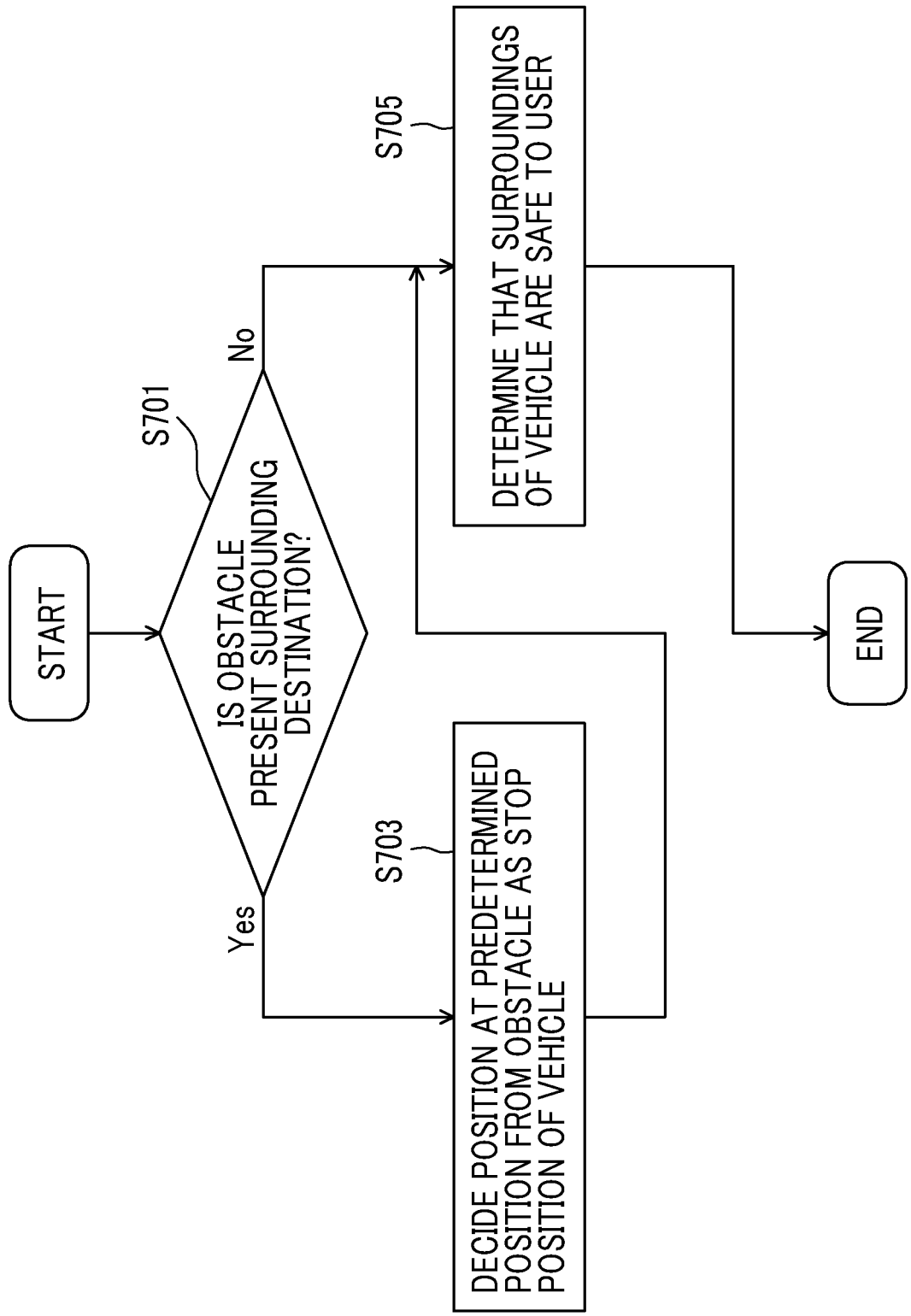
FIG. 7 is a flowchart (first view) illustrating the operation of the vehicle.

FIG. 7 is a flowchart showing a first operation example where the ECU 19 determines the safety of the surroundings of the vehicle 10 in Step S511.

Figure 8:
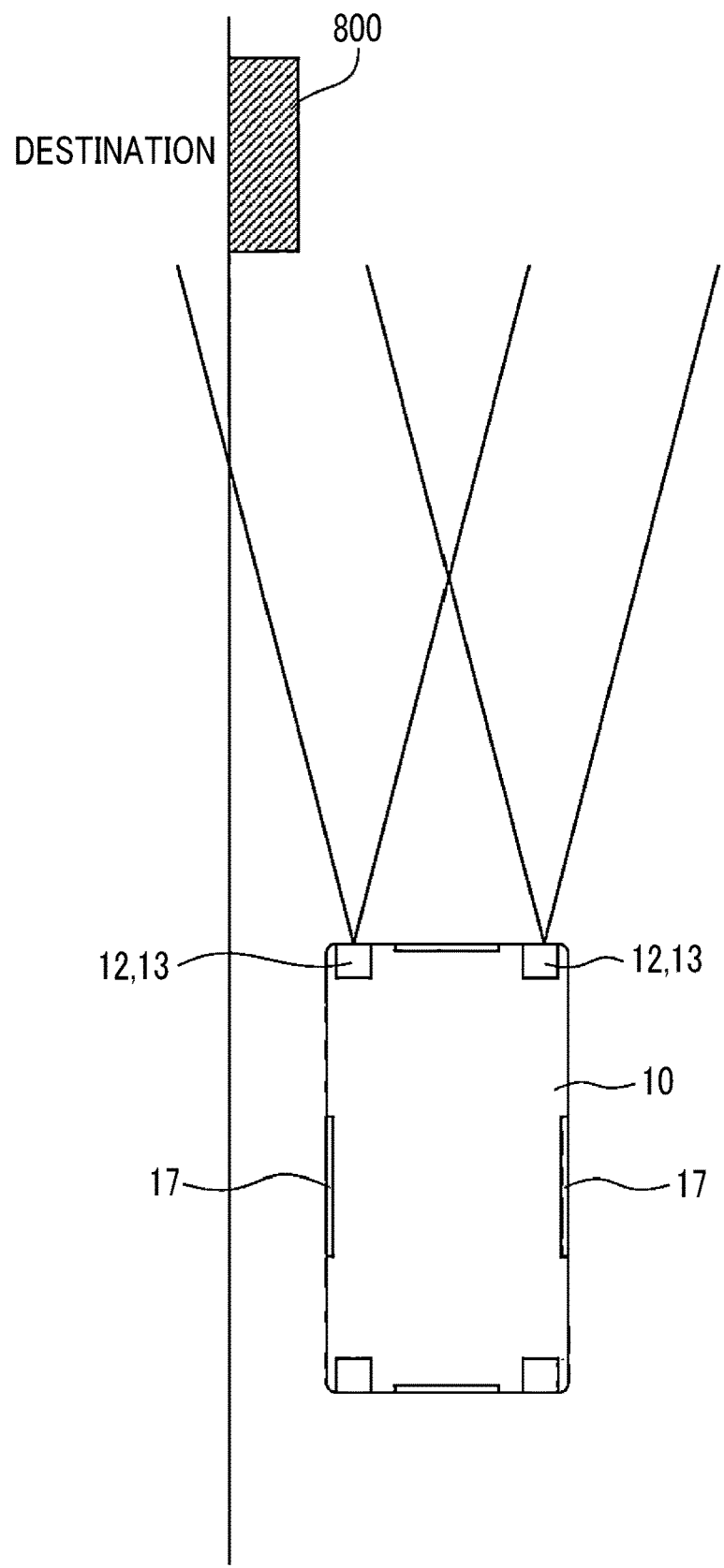
FIG. 8 is a diagram (first view) illustrating the operation of the vehicle.

First, in Step S701, the safety determination unit 33 of the processor 22 in the ECU 19 determines whether or not an obstacle 800 is present surrounding the destination based on video as the vehicle environment information surrounding the vehicle 10 output from the outside-vehicle cameras 12 while the vehicle 10 is moving while approaching the destination as shown in FIG. 8.

The safety determination unit 33 detects a predetermined obstacle surrounding the destination using the outside-vehicle cameras 12. For example, the safety determination unit 33 can use a machine learning technique in order to detect the predetermined obstacle 800 surrounding the destination. Specifically, the safety determination unit 33 uses a detector, such as a deep neural network (DNN), made to learn in advance in order to detect a predetermined obstacle on an image from an image included in the video obtained by the outside-vehicle cameras 12. The safety determination unit 33 inputs, to the detector, an image included in video surrounding the destination captured by the outside-vehicle cameras 12 of the vehicle 10 while the vehicle 10 is approaching the destination, and detects a predetermined obstacle output from the detector as the predetermined obstacle 800 surrounding the destination. As the obstacle 800, for example, a stationary object, such as a bicycle placed on a road, is exemplified.

The safety determination unit 33 obtains a position of the detected obstacle on a real space from coordinates and a size of an object on the image included in video captured by the outside-vehicle cameras 12 according to a projection transformation for obtaining coordinates of an object on a real space surrounding the destination. The projective transformation is decided based on, for example, an installation position and an installation angle of each of the outside-vehicle cameras 12 and internal parameters of the outside-vehicle cameras 12, such as a focal length. Then, in a case where the position of the detected obstacle on the real space is within a given range from the destination, the safety determination unit 33 determines that an obstacle is present surrounding the destination (Step S701—Yes). In a case where an obstacle is not present or the position of the detected obstacle on the real space is not within the given range from the destination, the safety determination unit 33 determines that an obstacle is not present surrounding the destination (Step S701—No). The given range from the destination can be, for example, 5 m, 10 m, and 15 m.

Furthermore, the safety determination unit 33 detects a predetermined obstacle surrounding the destination using the ranging sensors 13. For example, the safety determination unit 33 detects a three-dimensional shape of an object based on the measured values as the vehicle environment information surrounding the vehicle 10 output from the ranging sensors 13 and obtains a position of the detected object on the real space. The safety determination unit 33 can determine that an object having a predetermined height or more with respect to a road surface position obtained based on map data stored in the memory 21 is an obstacle. The safety determination unit 33 may set the predetermined height with respect to the road surface position to be smaller, thereby obtaining flatness of the road surface at the destination based on the measured values. In a case where the flatness of the road surface is bad, that is, in a case where unevenness is large, there is a concern that the unboarded user 50 is tripped up and falls down. In the specification, an obstacle includes an area where the flatness of the road surface is bad. Then, in a case where the position of the detected obstacle on the real space is within the given range from the destination, the safety determination unit 33 determines that an obstacle is present surrounding the destination (Step S701—Yes). In a case where an obstacle is not present or the position of the detected obstacle on the real space is not within the given range from the destination, the safety determination unit 33 determines that an obstacle is not present surrounding the destination (Step S701—No).

In a case where determination is made that an obstacle is present surrounding the destination (Step S701—Yes), the safety determination unit 33 decides a position at a predetermined distance from the obstacle 800 as a stop position of the vehicle 10 (Step S703). With this, it is possible to allow the user 50 who unboards the vehicle 10 to unboard the vehicle while avoiding the obstacle. The safety determination unit 33 may decide the predetermined distance corresponding to the given range described above. Then, the process progresses to Step S705.

In a case where determination is made that an obstacle is not present surrounding the destination (Step S701—No) and in a case where the position at the predetermined distance from the obstacle 800 is decided as the stop position of the vehicle 10 (Step S703), the safety determination unit 33 determines that the surroundings of the vehicle 10 are safe to the user who unboards the vehicle (Step S705).

Thus far, the first operation example has been described.

Figure 9:
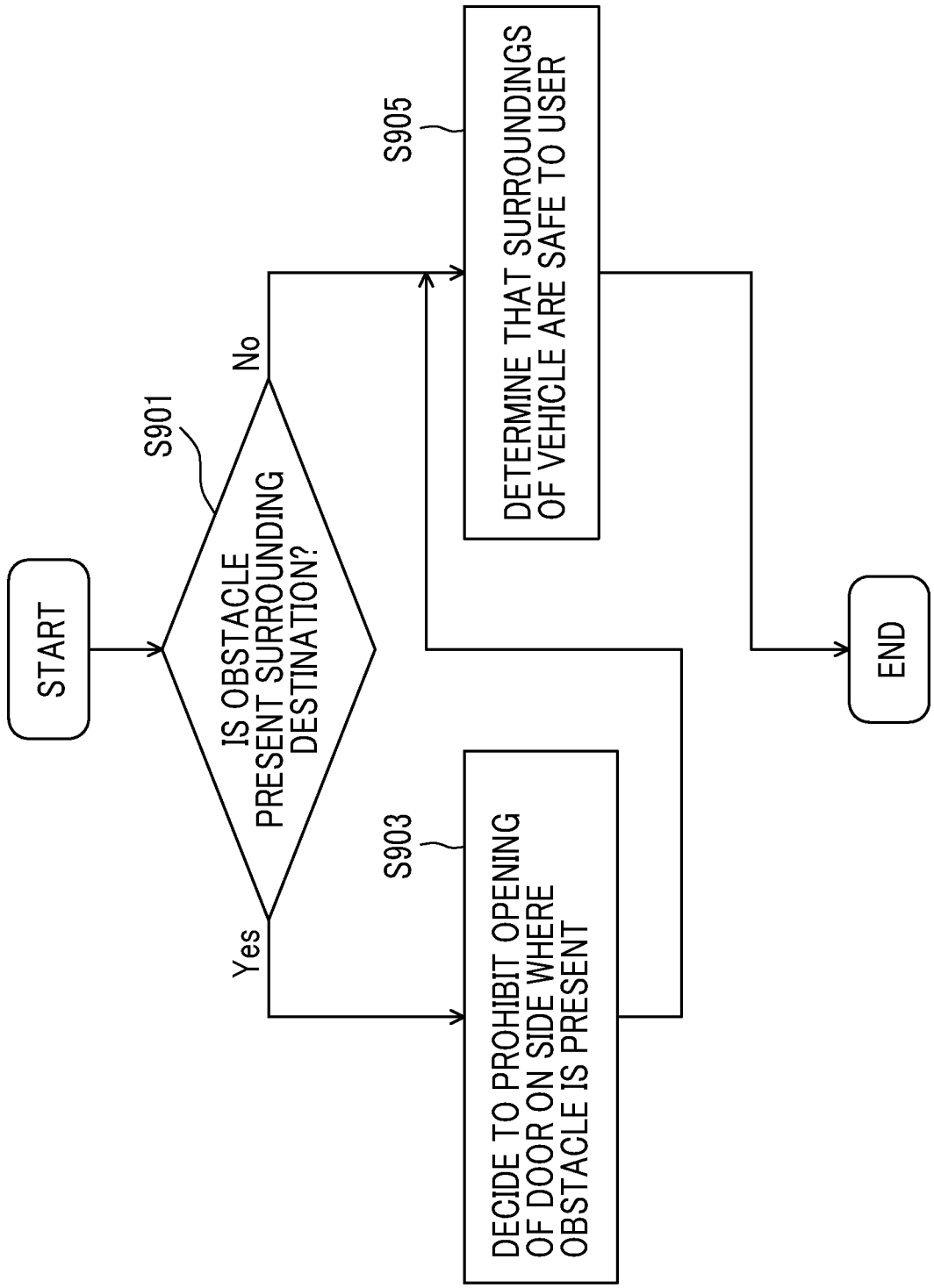
FIG. 9 is a flowchart (second view) illustrating the operation of the vehicle.

FIG. 9 is a flowchart showing a second operation example where the ECU 19 of the vehicle 10 determines the safety of the surroundings of the vehicle.

Processing of Steps S901 and S905 is the same as the processing of Steps S701 and S705 described above. In the second operation example, processing of the safety determination unit 33 in Step S903 in a case where determination is made that an obstacle is present surrounding the destination (Step S901—Yes) is different from that in the first operation example.

In a case where determination is made that an obstacle 800 is present surrounding the destination (Step S901—Yes), the safety determination unit 33 decides to prohibit opening of the door on a side where the obstacle 800 is present. With this, in the example shown in FIG. 8, the door control device 16 is prohibited to open and close the left door device 17 of the vehicle 10 where the obstacle 800 is present. The vehicle 10 is stopped at the destination, and then, opens and closes the right door device 17 where an obstacle is not present, thereby making the user 50 unboard the vehicle. Since an obstacle is not present on the right side of the vehicle 10 that is stopped at the destination, the safety determination unit 33 determines that the surroundings of the vehicle 10 are safe to the user who unboards the vehicle (Step S905). At a left-hand traffic place, in principle, the vehicle 10 opens and closes the left door to make the user 50 unboard the vehicle.

Thus far, Step S511 has been described.

Next, in Step S513, the vehicle 10 stops at the destination. The arrival determination unit 31 of the processor 22 in the ECU 19 determines that the vehicle arrives at the destination based on the positional information of the vehicle 10 output from the positioning sensor 11.

Next, in Step S515, the server 2 receives, from the arrival determination unit 31, arrival notification for notifying that the vehicle 10 arrives at the destination.

Next, in Step S517, the terminal 40 receives, from the server 2, the arrival notification for notifying that the vehicle 10 arrives at the destination and a fare adjustment request for requesting the payment of the fee of use of the vehicle 10.

Next, in Step S519, the terminal 40 is operated by the user 50 to execute arrival approval and payment processing. In order to approve the arrival of the vehicle 10 at the destination, the user 50 operates, for example, an arrival approval button (not shown) displayed on the terminal 40. In order to pay the fee, the user 50 operates a fare adjustment button (not shown) displayed on the terminal 40.

Next, in Step S601, the server 2 receives arrival approval notification and electronic payment information and a payment request of the user 50 from the terminal 40.

Next, in Step S605, the server 2 transmits the electronic payment information and the use fee of the user 50 to another server (not shown) executing electronic payment processing, and executes the electronic payment processing of the fee of use of the vehicle 10 by the user 50.

Next, in Step S607, the vehicle 10 receives, from the server 2, the arrival approval notification and fare adjustment end notification for notifying that the fare adjustment of the fee ends. The approval determination unit 32 of the processor 22 in the ECU 19 determines that the user 50 approves the arrival at the destination based on the arrival approval notification. The fare adjustment determination unit 35 of the processor 22 in the ECU 19 determines that the user 50 pays the fee of use of the vehicle 10 based on the fare adjustment end notification.

In Step S519 described above, the user 50 may execute the arrival approval and the payment processing using the IC card (not shown) having an electronic payment function, instead of the terminal 40. The user 50 makes the IC card approach the RFID communication device 18 mounted in the vehicle 10, whereby communication is performed between the IC card and the RFID communication device 18. The fare adjustment determination unit 35 of the processor 22 in the ECU 19 inputs the electronic payment information of the user 50 received from the IC card by the RFID communication device 18 through the RFID communication device 18. The fare adjustment determination unit 35 transmits the electronic payment information and the use fee of the user 50 to another server (not shown) executing the electronic payment processing through the network N. The processor 22 in the ECU 19 receives payment completion notification from another server executing the electronic payment processing through the network N. With this, the fare adjustment determination unit 35 determines that the user 50 pays the fee of use of the vehicle 10 based on the payment completion notification as the fare adjustment end notification. The approval determination unit 32 determines the payment completion notification as the arrival approval notification, thereby determining that the user 50 approves the arrival at the destination.

Next, in Step S609, the vehicle 10 determines whether or not the surroundings of the vehicle 10 are safe to the user who unboards the vehicle based on the vehicle environment information surrounding the vehicle 10.

Figure 10:
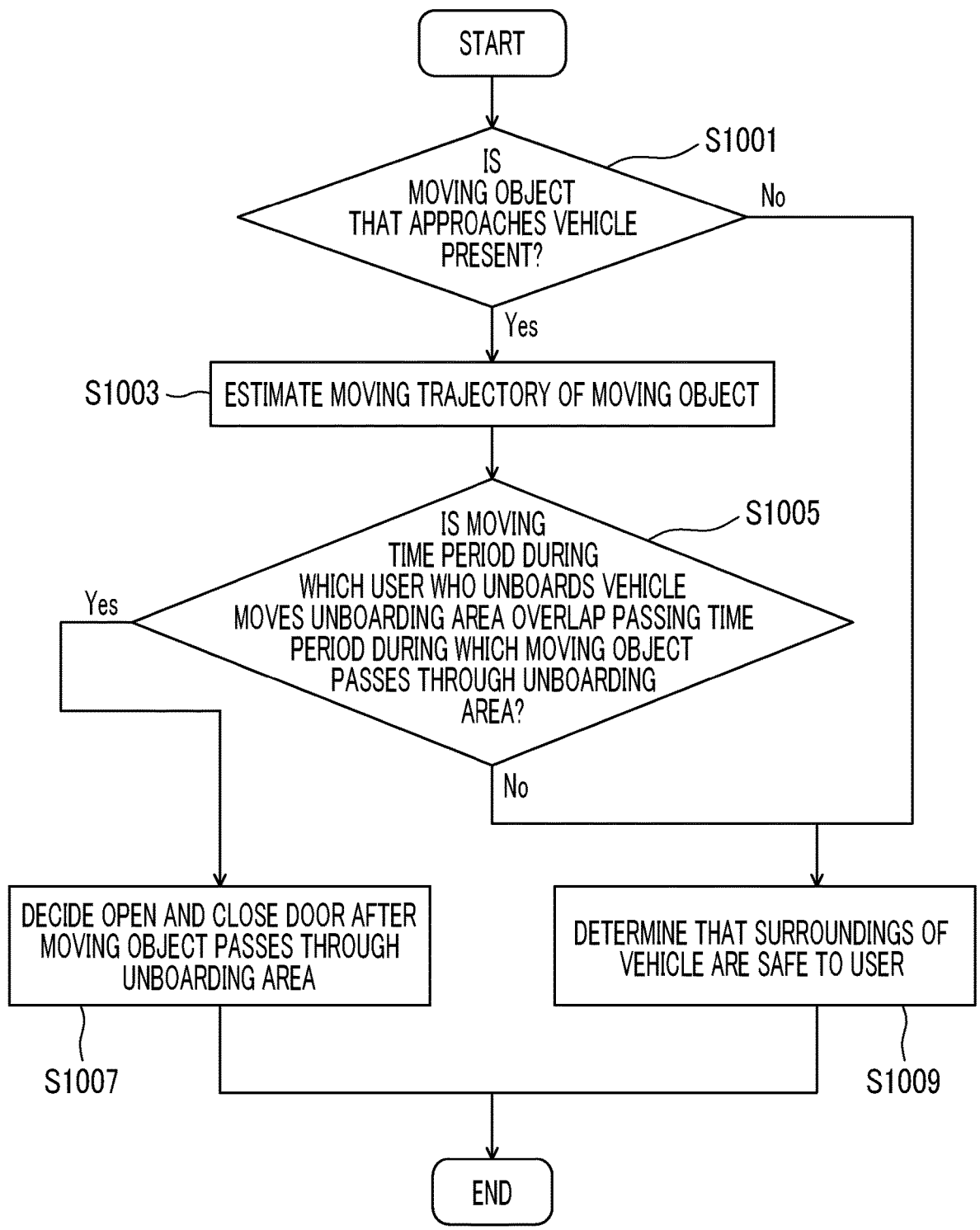
FIG. 10 is a flowchart (third view) illustrating the operation of the vehicle.

FIG. 10 is a flowchart showing an operation example where the ECU 19 determines the safety of the surroundings of the vehicle 10 in Step S609.

First, in Step S1001, the safety determination unit 33 of the processor 22 in the ECU 19 determines whether or not a moving object that moves to approach the vehicle 10 is present based on the measured values as the vehicle environment information surrounding of the vehicle 10 output from the ranging sensors 13. For example, the safety determination unit 33 obtains a position of an object on a real space at predetermined time intervals based on the measured values of the ranging sensors 13. Then, in a case where the distance between the vehicle 10 and the object is shortened with time, and a moving speed of the object is different from a moving speed of the vehicle 10, determination is made that a moving object that moves to approach the vehicle 10 is present (Step S1001—Yes).

In a case where a moving object that moves to approach the vehicle 10 is present (Step S1001—Yes), the safety determination unit 33 estimates a moving trajectory of the moving object based on the position of the moving object on the real space obtained at the predetermined time intervals (Step S1003). The safety determination unit 33 may estimate the moving trajectory of the moving object using a prediction filter, such as a Kalman filter, with the position of the moving object as an observation amount. Alternatively, the safety determination unit 33 may obtain a current speed vector of the moving object, may obtain a moving vector as a product of the speed vector of the moving object and a time to be estimated in the future (for example, one second later), and may obtain, as the moving trajectory of the moving object, an end point of the moving vector in a case where a start point of the moving vector is set to a current position of the moving object.

Figure 11:
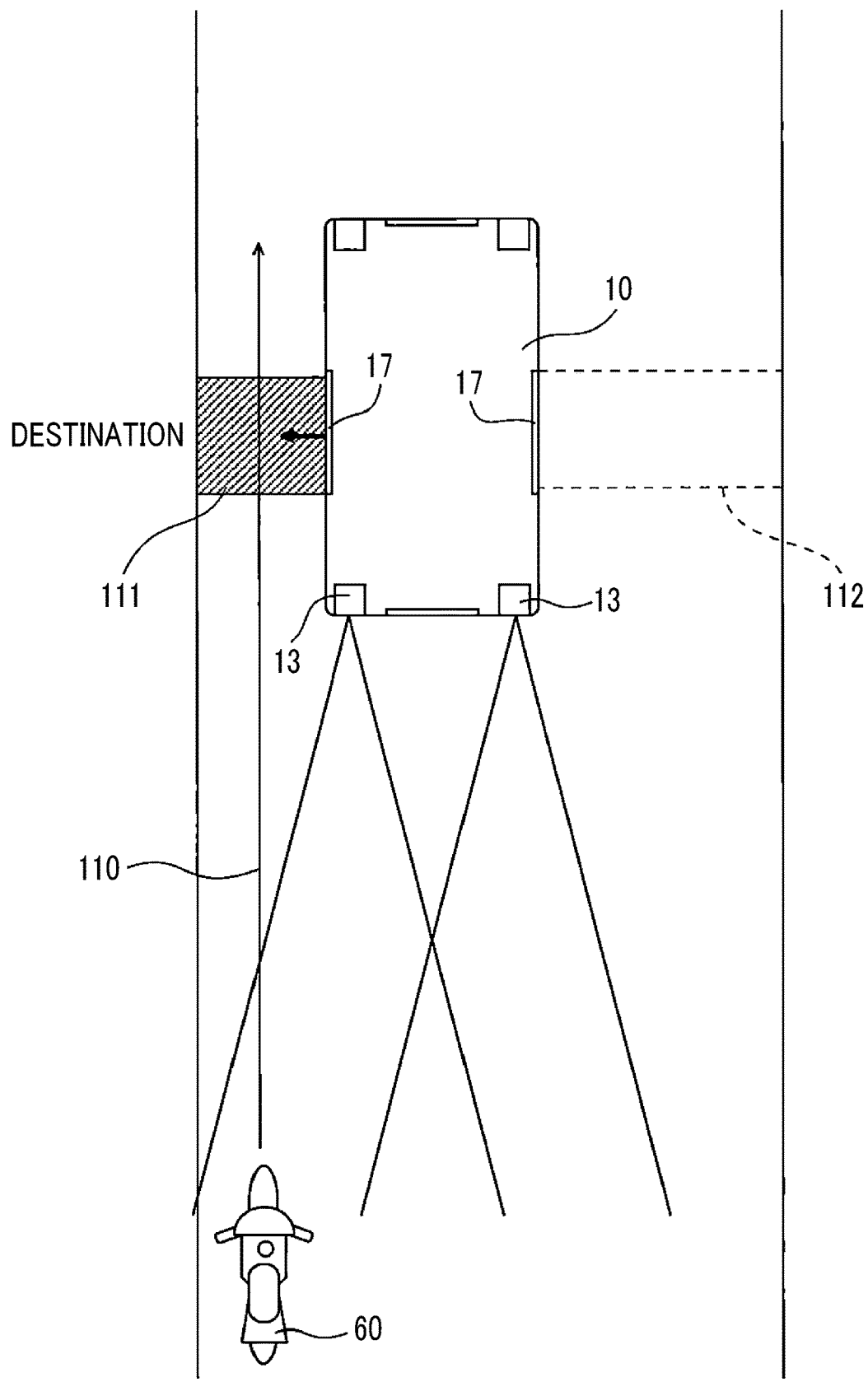
FIG. 11 is a diagram (second view) illustrating the operation of the vehicle.

FIG. 11 shows a future moving trajectory 110 estimated for a moving object 60 by the safety determination unit 33.

Next, in Step S1005, the safety determination unit 33 determines whether or not a moving time period during which the user 50 who unboards the vehicle moves an unboarding area overlaps a passing time period during which the moving object 60 passes through the unboarding area.

In an example shown in FIG. 11, an unboarding area 111 is an area having a width of an opening of the door of the door device 17 and a length between the vehicle 10 and an end of a road at a destination. A moving time period during which the user 50 who unboards the vehicle moves the unboarding area 111 is a time period between a time when the user 50 who goes out the door of the vehicle 10 enters the unboarding area 111 and a time when the user 50 leaves the unboarding area 111. A moving speed of the user 50 who moves the unboarding area 111 can be set to, for example, 4 km per hour.

The safety determination unit 33 obtains the passing time period, during which the moving object 60 passes through the unboarding area 111, based on the estimated moving trajectory. The passing time period is a time period between a time when the moving object 60 enters the unboarding area 111 and a time when the moving object 60 leaves the unboarding area 111.

Then, in a case where the moving time period of the moving object overlaps the passing time period of the user 50 even slightly, the safety determination unit 33 determines that the moving time period overlaps the passing time period. In a case where the moving time period overlaps the passing time period, there is a concern that the user 50 who unboards the vehicle 10 comes into contact with the moving object 60. A case where the moving time period does not overlap the passing time period includes a case where the moving object 60 passes through the unboarding area 111 before the door of the vehicle 10 is opened and a case where the user 50 ends moving the unboarding area 111 before the moving object 60 reaches the unboarding area 111.

In Step S903 described above, in a case where the safety determination unit 33 decides to open and close the right door device 17 with no obstacle to make the user 50 unboard the vehicle, the safety determination unit 33 performs the determination of Step S1005 for an unboarding area 112 (see FIG. 11).

In a case where the safety determination unit 33 determines that the moving time period overlaps the passing time period (Step S1005—Yes), the safety determination unit 33 decides the open and close the door after the moving object passes through the unboarding area 111 (Step S1007). With this, it is possible to restrain the user 50 who unboards the vehicle 10 from coming into contact with the moving object 60. Since the processing of Step S609 is repeatedly executed until the door device 17 is opened and closed to make the user 50 unboard the vehicle, after the moving object passes through the unboarding area 111, the safety determination unit 33 determines that a moving object that moves to approach the vehicle 10 is not present (Step S1001—No).

In a case where the safety determination unit 33 determines that the moving time period does not overlap the passing time period (Step S1005—No) and in a case where the safety determination unit 33 determines that a moving object that moves to approach the vehicle 10 is not present (Step S1001—No), the safety determination unit 33 determines that the surroundings of the vehicle 10 are safe to the user who unboards the vehicle (Step S1009).

Thus far, Step S609 has been described.

Next, in Step S611, the vehicle 10 opens and closes the door device 17 under a reference condition for defining a speed of opening the door or an opening degree of the door to make the user 50 unboard the vehicle. The door controller 34 of the processor 22 in the ECU 19 requests the door control device 16 to open the door since the arrival determination unit 31 determines that the vehicle 10 arrives at the destination, the approval determination unit 32 determines that the user 50 approves the arrival of the vehicle 10 at the destination, the safety determination unit 33 determines that the surroundings of the vehicle 10 are safe to the user who unboards the vehicle, and the fare adjustment determination unit 35 determines that the user pays the fee of use of the vehicle 10. The door control device 16 opens and closes the door device 17 to make the user 50 unboard the vehicle. In a case where a determination result of any determination unit is negative, the door controller 34 notifies the server 2 of the determination result through the network N. The server 2 notifies the terminal 40 of the determination result through the network N.

In Step S903 described above, in a case where the safety determination unit 33 decides to open and close the right door device 17 with no obstacle to make the user 50 unboard the vehicle, the door controller 34 makes the door control device 16 open and close the right door device 17 with no obstacle to make the user 50 unboard the vehicle.

With the system of the embodiment described above, since the door is opened and closed after confirmation that the surroundings of the vehicle are safe to the user who unboards the vehicle, it is possible to secure safety in a case where the user unboards the vehicle.

In the present disclosure, the vehicle information processing device and the vehicle information processing method of the embodiment described above can be appropriately changed without departing from the spirit and scope of the present disclosure.

For example, in a case where the safety determination unit 33 of the processor 22 in the ECU 19 determines that the surroundings of the vehicle 10 are safe to the user who unboards the vehicle based on the moving trajectory, the door controller 34 may execute the following processing.

For example, since the user 50 ends moving the unboarding area 111 before the moving object 60 reaches the unboarding area 111, even in a case where determination is made that the surroundings of the vehicle 10 are safe to the user who unboards the vehicle, the moving object 60 is moving to approach the vehicle 10. Accordingly, in a case where the safety determination unit 33 determines that the surroundings of the vehicle 10 are safe to the user who unboards the vehicle based on the moving trajectory, the door controller 34 may request the door control device 16 to open the door after displaying unboarding of the user 50 to be visible from the outside of the vehicle 10 using the outside-vehicle display device 15. With this, it is possible to alert a driver who drives the moving object 60 approaching the vehicle 10 to the user 50 who unboards the vehicle 10.

In a case where the safety determination unit 33 determines that the surroundings of the vehicle 10 are safe to the user who unboards the vehicle based on the moving trajectory, the door controller 34 may request the door control device 16 to open the door under a condition that the speed of opening the door is slower or the opening degree of the door is narrower than the reference condition. With this, it is possible to alert the driver who drives the moving object 60 approaching the vehicle 10 to the user 50 who unboards the vehicle 10. It is also possible to alert the user 50 to the surroundings in unboarding the vehicle.

In the above-described embodiment, although the vehicle determines that the surroundings of the vehicle are safe to the user who unboards the vehicle, the vehicle may determine that the surroundings of the vehicle are safe to a user who boards the vehicle.

What is claimed is:

1. A vehicle information processing device comprising:
   an arrival determination unit configured to determine, based on positional information of a vehicle under autonomous driving control, whether or not the vehicle arrives at a destination;
   an approval determination unit configured to determine, based on approval notification for notifying that a user approves the arrival of the vehicle at the destination, whether or not the user approves the arrival of the vehicle at the destination;
   a safety determination unit configured to determine whether or not surroundings of the vehicle are safe to the user who unboards the vehicle based on vehicle environment information surrounding the vehicle; and
   a door controller configured to request a door control device to open a door in a case where determination is made that the vehicle arrives at the destination, determination is made that the user approves the arrival of the vehicle at the destination, and determination is made that the surroundings of the vehicle are safe to the user who unboards the vehicle,
   wherein the safety determination unit is configured to;
   determine whether or not a moving object moving to approach the vehicle is present based on the vehicle environment information surrounding the vehicle,
   in a case where determination is made that the moving object is present, estimate a moving trajectory of the moving object, and
   determine whether the surroundings of the vehicle are safe to the user who unboards the vehicle based on the moving trajectory.

2. The vehicle information processing device according to claim 1, further comprising a fare adjustment determination unit configured to determine, based on fare adjustment end notification for notifying that the user pays a fee of use of the vehicle, whether or not the user pays the fee of the use of the vehicle,
   wherein the door controller is configured to request the door control device to open the door in a case where determination is made that the vehicle arrives at the destination, determination is made that the user approves the arrival of the vehicle at the destination, determination is made that the surroundings of the vehicle are safe to the user who unboards the vehicle, and determination is made that the user pays the fee of the use of the vehicle.

3. The vehicle information processing device according to claim 1, wherein the door controller is configured to display unboarding of the user to be visible from an outside of the vehicle using a display device and then request the door control device to open the door in a case where the safety determination unit determines that a moving object approaching the vehicle is present and determines that the surroundings of the vehicle are safe to the user who unboards the vehicle based on the moving trajectory of the moving object.

4. The vehicle information processing device according to claim 1, wherein:
   the door controller is configured to request the door control device to open the door under a first condition for defining a speed of opening the door or an opening degree of the door in a case where the safety determination unit determines that the moving object approaching the vehicle is not present; and
   the door controller is configured to request the door control device to open the door under a second condition that the speed of opening the door is slower or the opening degree of the door is narrower than the first condition in a case where the safety determination unit determines that the moving object approaching the vehicle is present and determines that the surroundings of the vehicle are safe to the user who unboards the vehicle based on the moving trajectory of the moving object.

5. The vehicle information processing device according to claim 1, wherein the safety determination unit is configured to determine whether or not an obstacle is present surrounding the destination before the vehicle arrives at the destination based on the vehicle environment information surrounding the vehicle.

6. The vehicle information processing device according to claim 5, wherein the safety determination unit is configured to, in a case where determination is made that an obstacle is present surrounding the destination, decide a stop position of the vehicle to a position at a predetermined distance from the obstacle.

7. The vehicle information processing device according to claim 5, wherein:
   the safety determination unit is configured to, in a case where determination is made that an obstacle is present surrounding the destination, determine that the surroundings of the vehicle are safe to the user who unboards the vehicle after deciding to prohibit the door control device from opening a door on a side on which the obstacle is present; and
   the door controller is configured to request the door control device to open a door on a side where the obstacle is not present.

8. The vehicle information processing device according to claim 1, wherein the safety determination unit is configured to determine that the surroundings of the vehicle are safe to the user who unboards the vehicle based on flatness of a road surface at the destination.

9. A vehicle information processing method comprising:
by a processor,
determining, based on positional information of a vehicle under autonomous driving control, whether or not the vehicle arrives at a destination;
determining, based on approval notification for notifying that a user approves the arrival of the vehicle at the destination, whether or not the user approves the arrival of the vehicle at the destination;
determining whether or not a moving object moving to approach the vehicle is present based on the vehicle environment information surrounding the vehicle;
estimating, in a case where determination is made that the moving object is present, a moving trajectory of the moving object,
determining whether or not the surroundings of the vehicle are safe to the user who unboards the vehicle based on vehicle environment information surrounding the vehicle and the moving trajectory; and
requesting a door control device configured to control opening and closing of a door of the vehicle to open the door in a case where determination is made that the vehicle arrives at the destination, determination is made that the user approves the arrival of the vehicle at the destination, and determination is made that the surroundings of the vehicle are safe to the user who unboards the vehicle.

10. A vehicle information processing device comprising:
an arrival determination unit configured to determine, based on positional information of a vehicle under autonomous driving control, whether or not the vehicle arrives at a destination;
an approval determination unit configured to determine, based on approval notification for notifying that a user approves the arrival of the vehicle at the destination, whether or not the user approves the arrival of the vehicle at the destination;
a safety determination unit configured to determine whether or not surroundings of the vehicle are safe to the user who unboards the vehicle based on vehicle environment information surrounding the vehicle, the safety determination unit is configured to determine whether or not an obstacle is present surrounding the destination before the vehicle arrives at the destination based on the vehicle environment information surrounding the vehicle; and
a door controller configured to request a door control device to open a door in a case where determination is made that the vehicle arrives at the destination, determination is made that the user approves the arrival of the vehicle at the destination, and determination is made that the surroundings of the vehicle are safe to the user who unboards the vehicle.

* * * * *